(12) United States Patent
Fan et al.

(10) Patent No.: US 11,704,919 B2
(45) Date of Patent: Jul. 18, 2023

(54) HIGH-POWER-MICROSCOPE-ASSISTED IDENTIFICATION METHOD OF MAIZE HAPLOID PLANTS

(71) Applicant: Institute of Food Crops, Yunnan Academy of Agricultural Sciences, Kunming (CN)

(72) Inventors: Xingming Fan, Kunming (CN); Fuyan Jiang, Kunming (CN); Hongmei Chen, Kunming (CN); Chunxia Xu, Kunming (CN)

(73) Assignee: Institute of Food Crops, Yunnan Academy of Agricultural Sciences, Kunming (CN)

( * ) Notice: Subject to any disclaimer, the term of this patent is extended or adjusted under 35 U.S.C. 154(b) by 8 days.

(21) Appl. No.: 17/455,599

(22) Filed: Nov. 18, 2021

(65) Prior Publication Data

US 2022/0358306 A1    Nov. 10, 2022

(30) Foreign Application Priority Data

May 6, 2021    (CN) .......................... 202110492370.1

(51) Int. Cl.
*G02B 21/36* (2006.01)
*G06V 20/69* (2022.01)

(52) U.S. Cl.
CPC ......... *G06V 20/698* (2022.01); *G02B 21/367* (2013.01)

(58) Field of Classification Search
CPC .......................... G06V 20/698; G02B 21/367
USPC ........... 348/79, E7.086; 382/106; 73/863.01; 435/40.52

See application file for complete search history.

(56) References Cited

U.S. PATENT DOCUMENTS

| | | | | |
|---|---|---|---|---|
| 5,998,129 A | * | 12/1999 | Schutze | G01N 1/04 435/40.52 |
| 2002/0069265 A1 | * | 6/2002 | Bountour | H04N 21/47211 348/E7.086 |
| 2017/0067067 A1 | * | 3/2017 | Chintamanani | C12N 9/18 |
| 2019/0327923 A1 | * | 10/2019 | Yang | A01H 1/02 |
| 2020/0263189 A1 | * | 8/2020 | Fox | C12N 9/22 |

* cited by examiner

*Primary Examiner* — Jayanti K Patel
*Assistant Examiner* — Richard B Carter
(74) *Attorney, Agent, or Firm* — DLA Piper LLP (US)

(57) ABSTRACT

A high-power-microscope-assisted identification method of maize haploid plants is provided, the method is implemented by a device including a high power microscope, a main frame disposed on an objective table of the high power microscope and a computer and includes four procedures of sample information input, automatic testing of a batch of samples, automatic analysis and comparison, and automatic generation of data results. Vertical sliding grooves are symmetrically formed in the main frame, and a vertical supporting plate is disposed at an upper end of the main frame. Horizontal sliding grooves are symmetrically formed in the vertical supporting plate, and a horizontal supporting plate is disposed on the vertical supporting plate.

4 Claims, 4 Drawing Sheets

HIGH-POWER-MICROSCOPE-ASSISTED IDENTIFICATION METHOD OF MAIZE HAPLOID PLANTS

CROSS REFERENCE TO RELATED APPLICATION

This application claims priority to Chinese Patent Application No. 202110492370.1, filed May 6, 2021, which is herein incorporated by reference in its entirety.

TECHNICAL FIELD

The present disclosure relates to the technical field of laboratory testing, and in particular, to a high-power-microscope-assisted identification method of maize haploid plants.

BACKGROUND ART

Haploid breeding technique is such a method: haploids are produced spontaneously or by artificial induction, their ploidy is recovered by doubling of chromosomes via spontaneousness or artificial induction, and desired pure lines are obtained by selection on this basis. Compared with traditional breeding methods, the haploid breeding technique possesses the advantages of fast, accurate and efficient breeding in terms of selfing lines selection breeding, and thus has received increasing attention from breeders. However, spontaneous occurrence of the maize haploids is a rare event at a rate of generally less than 0.1%.

Therefore, fast and accurate identification of maize haploids is particularly important. At present, identification methods for maize haploids mainly include morphological identification, anatomical identification, cytological identification, radiological identification, genetic marker identification and molecular marker identification, etc. The morphological identification requires skilled technicians to operate. The cytological identification and the anatomical identification are accurate and slow, and hence not suitable for the identification of large quantities of materials. The radiological identification of haploids is fast, requires a large amount of work, and will cause irreversible damage to maize plants. In the genetic marker identification and molecular marker identification methods, since markers in grains vary greatly in performance in the marker system, a lot of manpower and materials are required, haploids that are inducted don't develop color, and haploid breeding can hardly be achieved for maize materials. Therefore, in order to solve such problems, a high-power-microscope-assisted identification method of maize haploid plants is proposed.

SUMMARY

An objective of some embodiments is to provide a high-power-microscope-assisted identification method of maize haploid plants in order to overcome the shortcomings in the prior art.

To achieve the above objective, the present disclosure adopts the following technical solutions:

A high-power-microscope-assisted identification method of maize haploid plants, the method being implemented by a device including a high power microscope, a main frame disposed on an objective table of the high power microscope, and a computer, where the method includes: inputting sample information, automatically testing samples in batches, performing automatic analysis and comparison, and automatically generating data results.

Preferably, vertical sliding grooves are symmetrically formed in the main frame, and a vertical supporting plate is disposed at an upper end of the main frame; horizontal sliding grooves are symmetrically formed in the vertical supporting plate, and a horizontal supporting plate is disposed on the vertical supporting plate; vertical runners, each of which is matched with a corresponding one of the vertical sliding grooves, are symmetrically secured to a lower surface of the vertical supporting plate, and a vertical actuator is disposed at one side of the vertical supporting plate; horizontal runners, each of which is matched with a corresponding one of the horizontal sliding grooves, are symmetrically secured to a lower surface of the horizontal supporting plate, and a horizontal actuator is disposed at one side of the horizontal supporting plate.

Preferably, spring clip bars are symmetrically secured to an upper surface of the horizontal supporting plate, and an L-shaped locating bar is fixedly mounted in a center of the upper surface of the horizontal supporting plate; and through holes matched with a light chopper on the high power microscope are formed in centers of the horizontal supporting plate and the vertical supporting plate.

Preferably, a transfer box is disposed between the computer and the high power microscope; a data wire is electrically connected to an upper end of the transfer box, and a PLC, an image pickup unit, a processor, a memory, an analyzer and a buzzer are fixedly disposed inside the transfer box; a pluggable camera is fixedly disposed at a tail end of the data wire; and the pluggable camera is located at an eyepiece of the high power microscope.

Preferably, inputting sample information includes: selecting a reference sample of a haploid maize seed for growing a seedling, taking tissue from a root of the seedling and cutting the tissue into slices, placing one of the slices on the horizontal supporting plate along the L-shaped locating bar to be a locating point for testing, fixing the one slice by using the spring clip bars, and adjusting a focal length of the high power microscope; controlling and adjusting parameters of movement time, movement locus and movement range of the horizontal actuator and the vertical actuator and inputting the parameters into the memory to be a testing procedure, and based on the testing procedure, starting the horizontal actuator and the vertical actuators by means of the processor and the PLC to drive the one slice to move along the movement locus which is fixed; and collecting first images of different positions in the one slice of the reference sample by means of the camera and the image pickup unit, analyzing the first images of the different positions by the processor, inputting the first images to the memory, analyzing a number of chromosomes in the first images, the number is a comparative number, completing the inputting sample information, and restoring original positions of the horizontal supporting plate and the vertical supporting plate by the testing procedure after removing the one slice of the reference sample.

Preferably, automatically testing samples in batches includes: preparing slices of each of the samples to be tested based on: selecting one of the samples of a haploid maize seed for growing a seedling, taking tissue from a root of the seedling and cutting the tissue into slices, placing one of the slices on the horizontal supporting plate along the L-shaped locating bar to be a locating point for testing, fixing the one slice by using the spring clip bars, and adjusting a focal length of the high power microscope; assigning respective labels to the slices; testing the slices in sequence according to the respective labels: inputting one of the labels to the computer, placing one of the slices that corresponding to the one of the labels on the horizontal supporting plate, collecting images according to the testing procedure, and inputting collected first data into the memory in sequence; and generating a warning sound by the buzzer after completing the testing procedure, performing next testing procedure, and completing sequential testing procedure of remaining ones of the slices with corresponding ones of the labels.

Preferably, performing automatic analysis and comparison includes: through the computer, extracting second images obtained in testing the slices in sequence according to the respective labels, and in generating a warning sound by the buzzer after completing the testing procedure, performing next test and identification, and completing sequential test and identification of remaining ones of the slices with corresponding ones of the labels, where each of the second images is corresponding to a corresponding one of the labels; and analyzing the second images by the analyzer, calculating a number of chromosomes in the second images for comparison with the comparative number; comparing the number of chromosomes in the second images with the comparative number in the sample information; identifying the samples to be tested as haploid plants when the number of chromosomes in the second images matches the comparative number, storing second data to the memory, and obtaining information indicating whether the maize haploid plants are haploids.

Preferably, automatically generating data results includes: extracting the second data for transmission to the computer, and automatically generating a document by using word software on the computer.

The high-power-microscope-assisted identification method of maize haploid plants provided in some embodiments has the following advantages.

1. According to some embodiments, with the aid of the high power microscope, maize seedlings are tested. During the whole operation process, based on one reference sample, identification of multiple samples of the maize seedlings can be achieved. By means of automatic identification, a lot of operation time can be saved. The identification time during the operation process can be shortened.

2. The number of chromosomes is calculated to determine whether a maize plant is a haploid plant. By using the high power microscope, a micro observation can be made on the maize plant sample to accurately calculate the number of chromosomes in the maize plant sample.

3. In the whole method, based on the principle of machine vision, the high power microscope is used to observe maize seedlings. Multiple samples to be tested are observed, and the images of samples are compared with a reference sample by using an image analysis method. Automatic testing and high testing accuracy rate are achieved.

Figure 1:
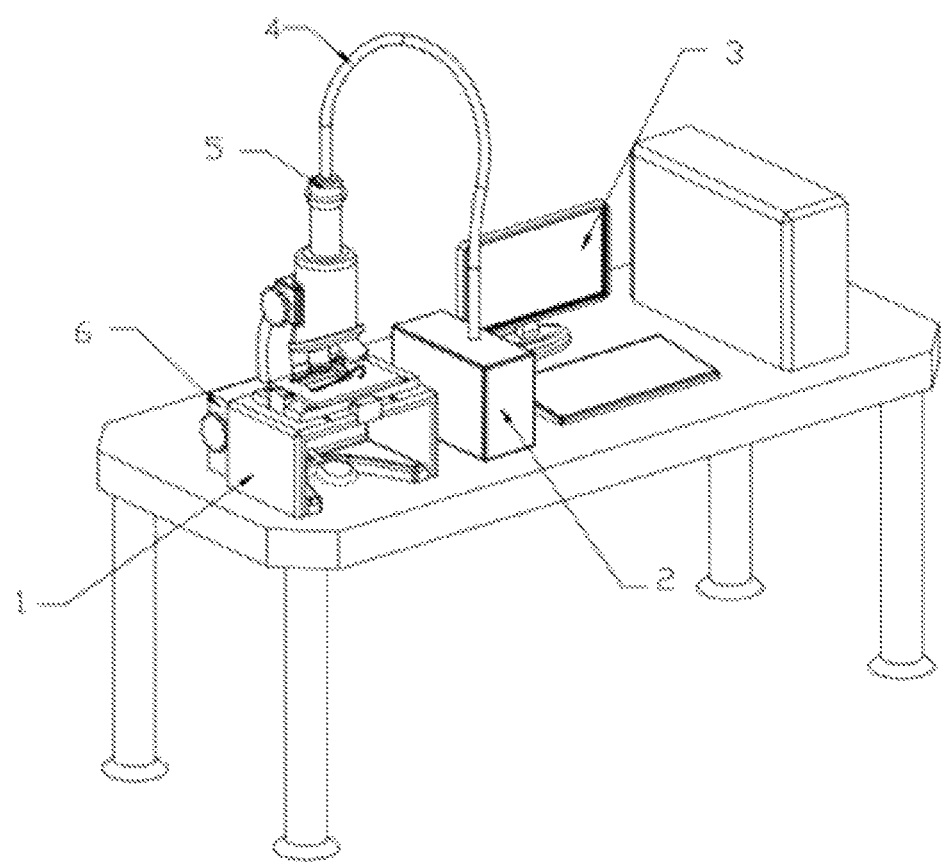
FIG. 1 is a structural schematic diagram of devices involved in a high-power-microscope-assisted identification method of maize haploid plants according to the present disclosure.

Reference Numerals: 1 main frame; 2 transfer box; 3 computer; 4 data wire; 5 pluggable camera; 6 high power microscope; 7 horizontal supporting plate; 8 vertical supporting plate; 9 horizontal runner; 10 vertical runner; 11 horizontal sliding groove; 12 vertical sliding groove; 13 vertical actuator; 14 horizontal actuator; 15 L-shaped locating bar; 16 spring clip bar; 17 PLC; 18 image pickup unit; 19 processor; 20 memory; 21 analyzer; and 22 buzzer.

DETAILED DESCRIPTION OF THE EMBODIMENTS

The technical solutions of the embodiments of the present disclosure will be described below clearly and completely with reference to the accompanying drawings. Apparently, the described embodiments are merely a part rather than all of the embodiments of the present disclosure.

In the description of the present disclosure, it should be understood that orientation or position relationships indicated by terms such as "upper", "lower", "front", "rear", "left", "right", "top", "bottom", "inside" and "outside" are based on what are illustrated in the drawings. These terms are merely intended to facilitate and simplify the description of the present disclosure, rather than to indicate or imply that the mentioned device or elements must have a specific orientation or must be constructed and operated in a specific orientation. Therefore, these terms should not be understood as a limitation to the present disclosure.

Figure 2:
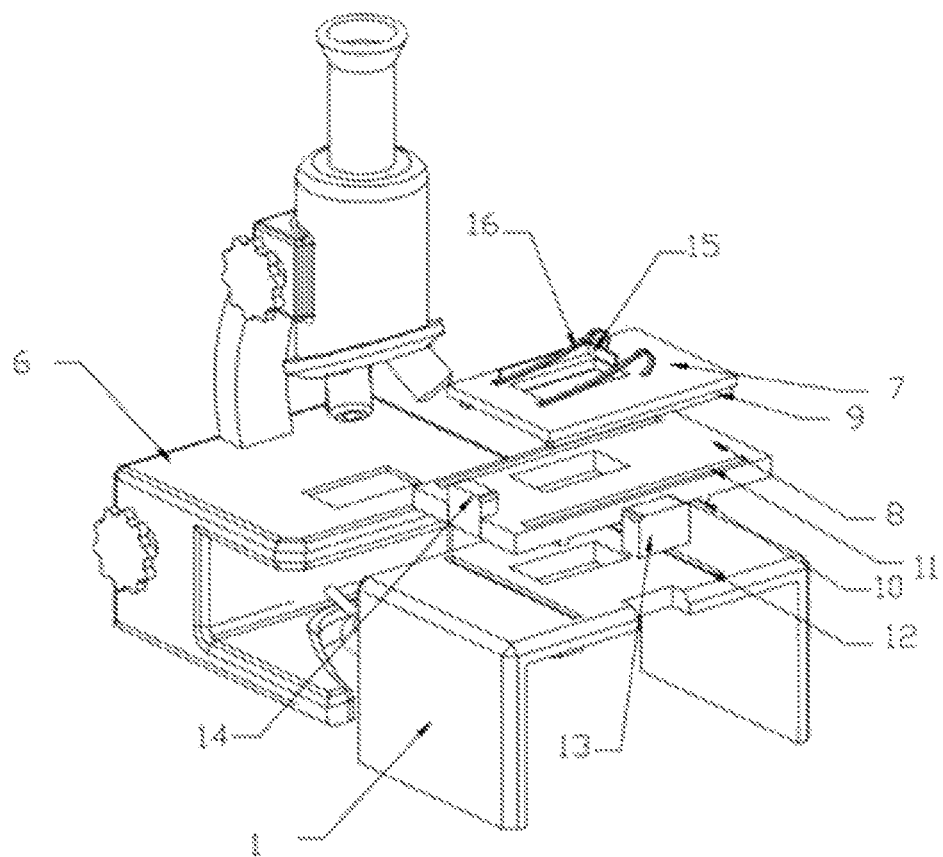
FIG. 2 is an exploded view of auxiliary structural components involved in a high-power-microscope-assisted identification method of maize haploid plants according to the present disclosure.
Figure 3:
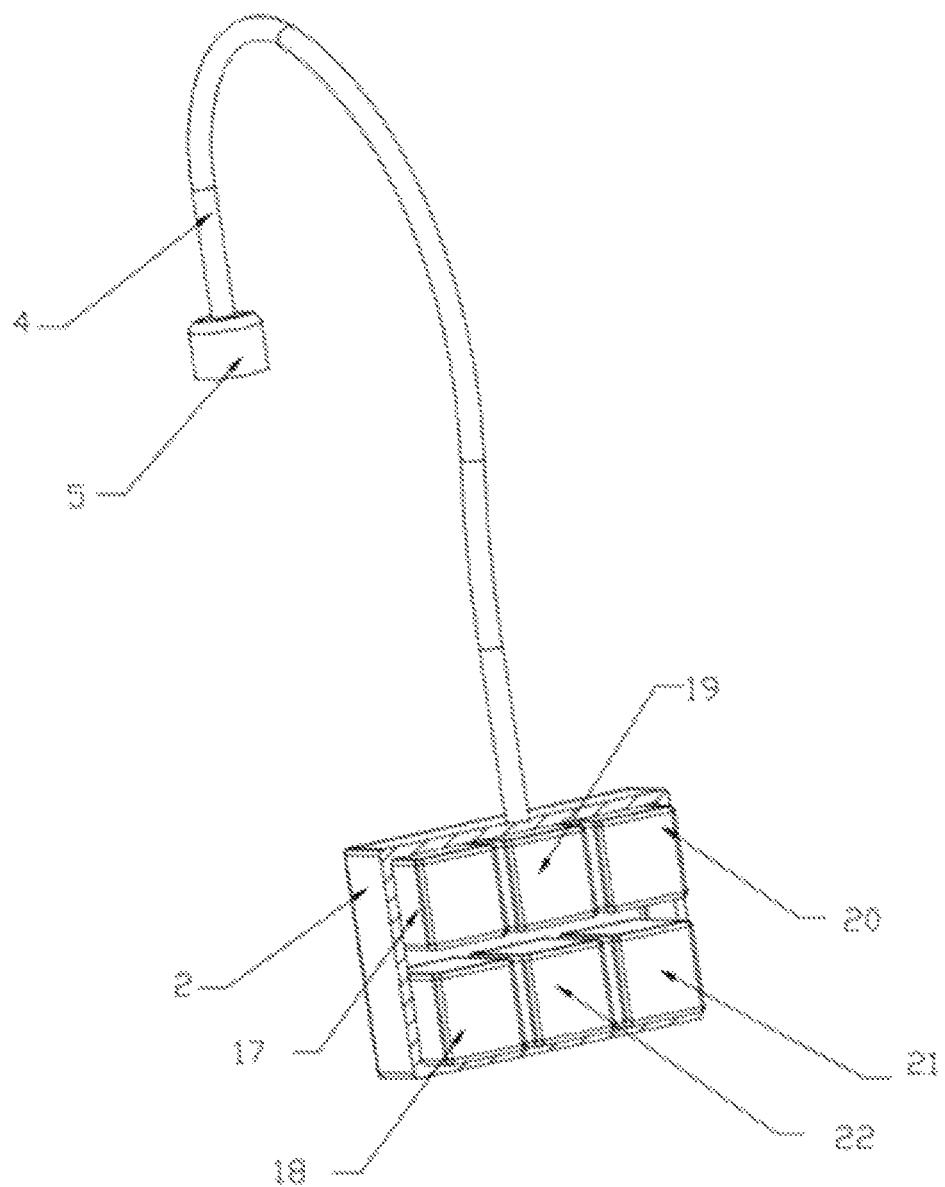
FIG. 3 is a cross-sectional view of components in a transfer box involved in a high-power-microscope-assisted identification method of maize haploid plants according to the present disclosure.

With reference to FIG. 1, FIG. 2 and FIG. 3, a high-power-microscope-assisted identification method of maize haploid plants is provided. The method is implemented by a device including a high power microscope 6, a main frame 1 disposed on an objective table of the high power microscope 6, and a computer 3, and the method includes four procedures of sample information input, automatic testing of samples in batches, performing automatic analysis and comparison, and automatic generation of data results. Vertical sliding grooves 12 are symmetrically formed in the main frame 1, and a vertical supporting plate 8 is disposed at an upper end of the main frame 1. Horizontal sliding grooves 11 are symmetrically formed in the vertical supporting plate 8, and a horizontal supporting plate 7 is disposed on the vertical supporting plate 8. Vertical runners 10, each of which is matched with a corresponding vertical sliding groove 12, are symmetrically secured to a lower surface of the vertical supporting plate 8, and a vertical actuator 13 is disposed at one side of the vertical supporting plate 8. Horizontal runners 9, each of which is matched with a corresponding horizontal sliding groove 11, are symmetrically secured to a lower surface of the horizontal supporting plate 7, and a horizontal actuator 14 is disposed at one side of the horizontal supporting plate 7. Spring clip bars 16 are symmetrically secured to an upper surface of the horizontal supporting plate 7, and an L-shaped locating bar 15 is fixedly mounted in a center of the upper surface of the horizontal supporting plate 7. Through holes matched with a light chopper on the high power microscope 6 are formed in the centers of the horizontal supporting plate 7 and the vertical supporting plate 8. A transfer box 2 is disposed between the computer 3 and the high power microscope 6.

A data wire 4 is electrically connected to an upper end of the transfer box 2, and a PLC (programmable logic controller) 17, an image pickup unit 18, a processor 19, a memory 20, an analyzer 21 and a buzzer 22 are fixedly disposed inside the transfer box 2. A pluggable camera 5 is fixedly disposed at a tail end of the data wire 4. The pluggable camera 5 is located at an eyepiece of the high power microscope 6.

According to the present disclosure, the procedure SE01 that is sample information input, the procedure SE02 that is automatic testing of samples in batches, the procedure SE03 that is automatic analysis and comparison, and the procedure SE04 that is automatic generation of data results are specifically described as follows.

Figure 4:
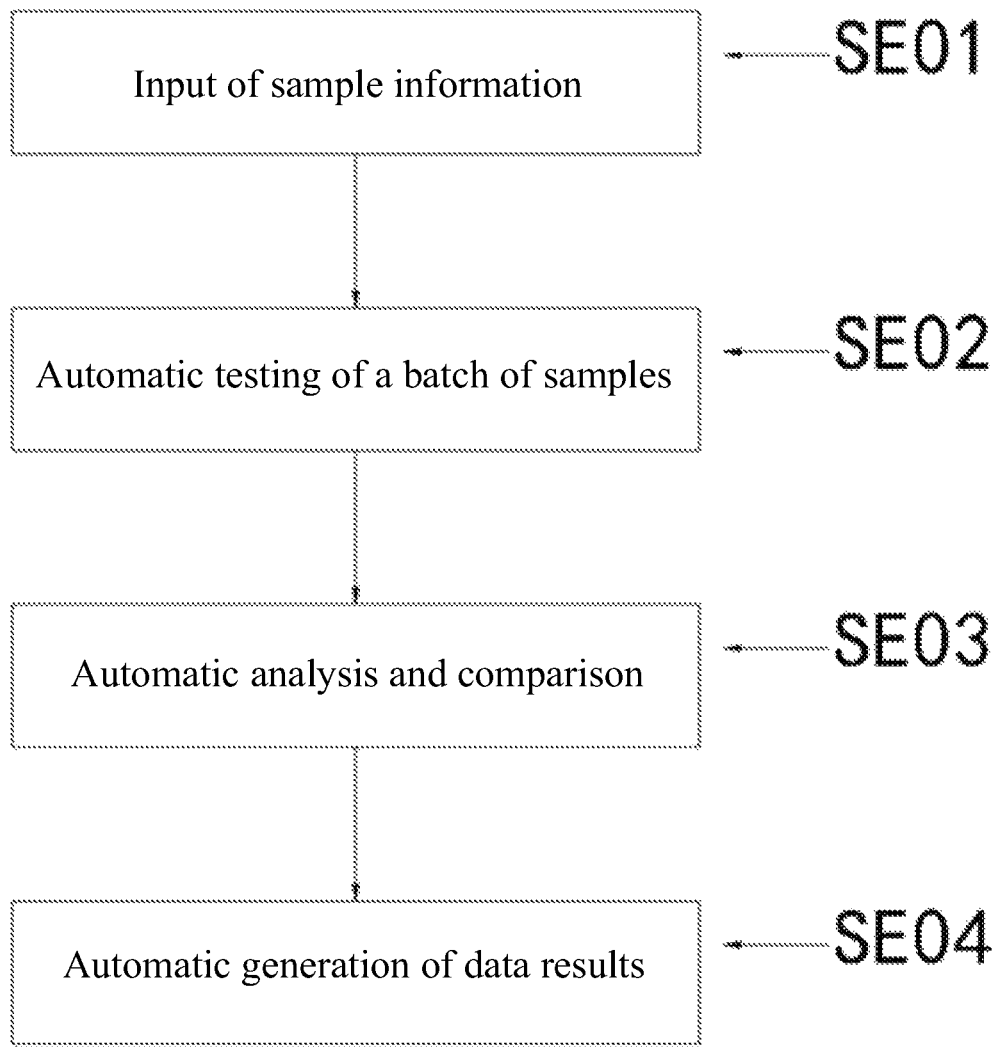
FIG. 4 is a flowchart of a high-power-microscope-assisted identification method of maize haploid plants according to the present disclosure.

In Example 1, with reference to FIG. 4, the procedure of sample information input includes the following steps SE01-1 to SE01-3.

In step SE01-1, a reference sample of the haploid maize seed is selected for growing a seedling, tissue from a root of the seedling is taken and the tissue is cut into slices, one slice of the slices is placed on the horizontal supporting plate along the L-shaped locating bar to be a locating point for testing, the one slice is fixed by using the spring clip bars, and a focal length of the high power microscope is adjusted;

In step SE01-2, parameters of movement time, movement locus and movement range of the horizontal actuator and the vertical actuator are controlled and adjusted and the parameters are input into the memory to be a testing procedure, and based on the testing procedure, the horizontal actuator and the vertical actuator are started by means of the processor and the PLC to drive the one slice to move along the movement locus which is fixed.

In step SE01-3, first images of different positions in the one slice of the reference sample are collected by means of the camera and the image pickup unit, the first images of the different positions by the processor are analyzed, the first images are input to the memory, a number of chromosomes in the first images are analyzed, the number is a comparative number, thus the inputting sample information is completed, and original positions of the horizontal supporting plate and the vertical supporting plate are restored by the testing procedure after removing the one slice.

Operating principle is as follows: procedures SE01 to SE03 are principal steps to perform. The high power microscope 6 is set up, and the main operating arrangement for implementing the method is arranged on the objective table of the high power microscope 6. The sample of haploid maize seedling is selected and sliced.

The slice of the sample is placed in the L-shaped locating bar 15 and fixed by the spring clip bar 16, and this position of the slice is taken as a locating point.

The PLC 17 controls start and stop of the horizontal actuator 14 and the vertical actuator 13, thereby driving the horizontal supporting plate 7 and the vertical supporting plate 8 to move orderly. The pluggable camera 5 records the images of the slice, transmits the images (i.e., images of a reference sample) to the memory 20 for storage, and records the operational procedure (i.e., basic operational procedure) of the horizontal actuator 14 and the vertical actuator 13 in the memory 20.

After the completion of the operation, the buzzer 22 produces a sound, indicating the completion of this procedure, and the original positions of the horizontal supporting plate 7 and the vertical supporting plate 8 are restored under the action of the horizontal actuator 14 and the vertical actuator 13.

In Example 2, with reference to FIG. 4, automatically testing samples in batches includes the following steps SE02-1 to SE02-3.

In step SE02-1, slices of each of the samples to be tested are prepared, and respective labels are assigned to the slices.

In step SE02-2, the slices are tested in sequence according to the respective labels with a way described in step SE01-1: inputting one of the labels to the computer, placing one of the slices that corresponding to the one of the labels on the horizontal supporting plate, collecting images according to the testing procedure, and inputting the collected first data into the memory in sequence.

In step SE02-3, a warning sound is generated by the buzzer after completing the testing procedure, the next procedure of testing is performed, and thereby sequential testing procedure of the remaining slices with corresponding ones of the labels is completed.

Performing automatic analysis and comparison includes the following steps SE03-1 to SE03-2.

In step SE03-1, through the computer, second images obtained in steps SE02-2 and SE02-3 are extracted, where each of the second images corresponds to one of the labels.

In step SE03-2, the second images by the analyzer are analyzed, a number of chromosomes in the second images are calculated for comparison with the comparative number; the number of chromosomes in the second images are compared with the comparative number in the sample information; the samples to be tested are identified as haploid plants when the number of chromosomes in the second images matches the comparative number, second data are stored to the memory, and information indicating whether the maize haploid plants are haploids is obtained.

The procedure of automatic generation of data results includes the following step SE04-1.

In step SE04-1, the second data in step SE03-2 is extracted for transmission to the computer, and a document is automatically generated by using word software on the computer.

A following report table (Table 1) is generated according to different parameters of the samples to be tested.

TABLE 1

| Batch Number | Induced Material | Selection breeding Method | Usage | Inducer line | Haploid Induction Rate (%) |
|---|---|---|---|---|---|
| 1 | F3760 | Selfing selection breeding | As maternal plant | Yunyou No. 2 | 9.34 |
| 2 | LH23 | Selfing selection breeding | As maternal plant | Yunyou No. 2 | 11.95 |
| 3 | W3760 | Cross breeding | As maternal plant | Yunyou No. 2 | 12.45 |
| 4 | JNY611 | Cross breeding | As maternal plant | Yunyou No. 2 | 7.8 |
| 5 | JNY886 | Cross breeding | As maternal plant | Yunyou No. 2 | 11.36 |

Advantages of some embodiments are as follows: simultaneous identification of maize seedlings in batches is achieved by performing analysis and comparison between images of the reference sample and images of the samples to be tested, and a table is generated automatically. During the operation, a lot of operation time can be saved. The accuracy rate of identification is high.

The number of chromosomes in root tip cells of maize seedlings with no color visualization in haploid induction is identified in batches, so that haploid seedlings are selected for transplanting. The technical problem of difficult haploid breeding from maize materials with no color visualization in haploid induction is solved.

The foregoing are merely descriptions of preferred specific embodiments of the present disclosure, but the protection scope of the present disclosure is not limited thereto. Any equivalent replacement or modification made within a technical scope of the present disclosure by a person skilled in the art according to the technical solutions of the present disclosure and inventive concepts thereof shall fall within the protection scope of the disclosure.

What is claimed is:

1. A high-power-microscope-assisted identification method of maize haploid plants, the method being implemented by a device comprising a high power microscope, a main frame disposed on an objective table of the high power microscope, and a computer, wherein the method comprises:
    inputting sample information,
    automatically testing samples in batches,
    performing automatic analysis and comparison, and
    automatically generating data results;
    wherein a transfer box is disposed between the computer and the high power microscope; a data wire is electrically connected to an upper end of the transfer box, and a PLC, an image pickup unit, a processor, a memory, an analyzer and a buzzer are fixedly disposed inside the transfer box; a pluggable camera is fixedly disposed at a tail end of the data wire; and the pluggable camera is located at an eyepiece of the high power microscope;
    wherein inputting sample information comprises:
    selecting a reference sample of a haploid maize seed for growing a seedling, taking tissue from a root of the seedling and cutting the tissue into slices, placing one of the slices on the horizontal supporting plate along the L-shaped locating bar to be a locating point for testing, fixing the one slice by using the spring clip bars, and adjusting a focal length of the high power microscope;
    controlling and adjusting parameters of movement time, movement locus and movement range of the horizontal actuator and the vertical actuator and inputting the parameters into the memory to be a testing procedure, and based on the testing procedure, starting the horizontal actuator and the vertical actuators by means of the processor and the PLC to drive the one slice to move along the movement locus which is fixed; and
    collecting first images of different positions in the one slice of the reference sample by means of the camera and the image pickup unit, analyzing the first images of the different positions by the processor, inputting the first images to the memory, analyzing a number of chromosomes in the first images, the number is a comparative number, completing the inputting sample information, and restoring original positions of the horizontal supporting plate and the vertical supporting plate by the testing procedure after removing the one slice of the reference sample;
    wherein automatically testing samples in batches comprises:
    preparing slices of each of the samples to be tested based on: selecting one of the samples of a haploid maize seed for growing a seedling, taking tissue from a root of the seedling and cutting the tissue into slices, placing one of the slices on the horizontal supporting plate along the L-shaped locating bar to be a locating point for testing, fixing the one slice by using the spring clip bars, and adjusting a focal length of the high power microscope;
    assigning respective labels to the slices;
    testing the slices in sequence according to the respective labels: inputting one of the labels to the computer, placing one of the slices that corresponding to the one of the labels on the horizontal supporting plate, collecting images according to the testing procedure, and inputting collected first data into the memory in sequence; and
    generating a warning sound by the buzzer after completing the testing procedure, performing next testing procedure, and completing sequential testing procedure of remaining ones of the slices with corresponding ones of the labels;
    wherein performing automatic analysis and comparison comprises:
    through the computer, extracting second images obtained in testing the slices in sequence according to the respective labels, and in generating a warning sound by the buzzer after completing the testing procedure, performing next test and identification, and completing sequential test and identification of remaining ones of the slices with corresponding ones of the labels, wherein each of the second images is corresponding to a corresponding one of the labels; and
    analyzing the second images by the analyzer, calculating a number of chromosomes in the second images for comparison with the comparative number; comparing the number of chromosomes in the second images with the comparative number in the sample information;
    identifying the samples to be tested as haploid plants when the number of chromosomes in the second images matches the comparative number, storing second data to the memory, and obtaining information indicating whether the maize haploid plants are haploids.

2. The high-power-microscope-assisted identification method of maize haploid plants according to claim 1, wherein vertical sliding grooves are symmetrically formed in the main frame, and a vertical supporting plate is disposed at an upper end of the main frame; horizontal sliding grooves are symmetrically formed in the vertical supporting plate, and a horizontal supporting plate is disposed on the vertical supporting plate; vertical runners, each of which is matched with a corresponding one of the vertical sliding grooves, are symmetrically secured to a lower surface of the vertical supporting plate, and a vertical actuator is disposed at one side of the vertical supporting plate; horizontal runners, each of which is matched with a corresponding one of the horizontal sliding grooves, are symmetrically secured to a lower surface of the horizontal supporting plate, and a horizontal actuator is disposed at one side of the horizontal supporting plate.

3. The high-power-microscope-assisted identification method of maize haploid plants according to claim 2, wherein spring clip bars are symmetrically secured to an upper surface of the horizontal supporting plate, and an L-shaped locating bar is fixedly mounted in a center of the upper surface of the horizontal supporting plate; and through holes matched with a light chopper on the high power microscope are formed in centers of the horizontal supporting plate and the vertical supporting plate.

4. The high-power-microscope-assisted identification method of maize haploid plants according to claim 1, wherein automatically generating data results comprises:

extracting the second data for transmission to the computer, and automatically generating a document by using word software on the computer.

* * * * *